May 3, 1966  J. H. BOCHINSKI ETAL  3,249,403
LIQUID SAMPLE REACTOR AND EVOLVED GAS DETECTOR
Filed Nov. 2, 1962  3 Sheets-Sheet 1

INVENTORS
JULIUS H. BOCHINSKI
BY JOE A. PORTER

ATTORNEY

May 3, 1966   J. H. BOCHINSKI ETAL   3,249,403
LIQUID SAMPLE REACTOR AND EVOLVED GAS DETECTOR
Filed Nov. 2, 1962                             3 Sheets-Sheet 2

INVENTORS
JULIUS H. BOCHINSKI
BY JOE A. PORTER

*Paul R. Harder*
ATTORNEY

United States Patent Office 3,249,403
Patented May 3, 1966

3,249,403
LIQUID SAMPLE REACTOR AND EVOLVED
GAS DETECTOR
Julius Harold Bochinski, Pasadena, and Joe A. Porter,
Whittier, Calif., assignors to Beckman Instruments, Inc.,
a corporation of California
Filed Nov. 2, 1962, Ser. No. 235,096
8 Claims. (Cl. 23—253)

This invention relates to gas chromatography and, more particularly, to an improved method and apparatus for the processing of a liquid sample, the gases of which are to be quantitatively analyzed in a gas chromatograph. The method and apparatus disclosed are particularly adapted to the quantitative analysis of gases and of volatile liquids contained in the blood such, for example, as oxygen, nitrogen, carbon dioxide, carbon monoxide, anesthetic gases and alcohol. The method and apparatus may also be utilized in biological oxygen demand analysis and in the analysis of gases dissolved in any non-volatile fluids such as other body liquids, sewage, or solid materials that are dissolvable in non-volatile fluids.

In the field of blood gas analysis the Van Slyke manometric apparatus has become widely used; a description of the apparatus and the techniques involved may be found in the book Methods of Quantitative Micro-Analysis, Melton and Waters, Edward Arnold (Publishers) Ltd., London, 2nd ed., 1955, beginning at page 550. While the Van Slyke apparatus provides very reproducible and highly accurate results, a relatively high degree of skill is required before the greatest precision can be achieved, relatively large blood samples must be utilized and the procedures for a complete analysis are time-consuming. Moreover, because of inherent limitations, not all the gases may be removed from a sample, necessitating the use of a correction factor. Therefore, the apparatus does not lend itself to the analysis of a large number of samples in a relatively short period of time.

In an effort to overcome these disadvantages various attempts have been made to perform the necessary analysis in chromatographic processes. One such process utilizes the continuous passage of the carrier gas through the sample container. Since the reagents employed to remove absorbable gases from the sample are generally diluted in an aqueous solution, the continuous flow of the carrier gas through the reagent result in saturation of the carrier gas with water which is then carried into the chromatographic column where it deposits and inhibits the selective absorption and desorption process therein, necessitating recalibration of the chromatograph, decreasing the resolution and eventually rendering the column ineffective. Further, since the reaction of the reagent with the sample takes, at a minimum, a finite period of time and since the carrier gas is continuously traversing the reagent and the sample, the gases released by the sample are spread through the carrier gas decreasing resolution and causing tailing of the peaks in the analysis chart. Since many applications preferably require the utilization of a detector of the thermal conductivity type, it becomes highly desirable to provide a chromatographic system having a continuous carrier gas flow which does not possess the foregoing disadvantages.

It is, therefore, a principal object of this invention to provide a chromatographic system utilizing a continuously flowing carrier gas to elute the gases contained in an aqueous solution without substantial contamination of the chromatographic column.

Another primary object of the invention is the provision of a process and an apparatus for handling a relatively large number of liquid samples for quantitative gas analysis that requires a minimum of skill in the performance of the method and in the operation of the apparatus, a minimum of time and a minimum quantity of the liquid sample.

Another object of the invention is the provision of an apparatus in which liquid samples may be processed for the quantitative analysis of the gases contained therein wherein a sample container and a reagent may be degassed and environmentally sealed; the liquid sample may be introduced into the container and reacted with the reagent without contamination of the interior environment of the container; and the resultant solution may be distributed over a large area to present a large liquid surface area over which the carrier gas of a gas chromatograph may be passed to elute the gases evolved.

Still another object is the provision of an apparatus wherein the sample container and a reagent therein may be degassed and environmentally sealed; the liquid sample introduced and reacted with the reagent; and the resulting solution distributed over a large area and the carrier gas of a continuous flow gas chromatograph passed through the container to elute the gases contained in the sample from the container without substantial interruption of the continuous flow of the carrier gas.

To accomplish the foregoing objects one preferred embodiment of the invention generally contemplates a readily removable sample container having a reaction chamber and a packed section. The reaction chamber contains a porous plate of a material which will allow the passage of gas but will retain liquid upon its surface while the packed section contains an inert porous packing material. The sample container is retained in a rotatable support in sealed relation therewith and provision is made for the passage of gases into and out of the container. A suitable reagent is introduced into the reaction chamber and the entire container is purged with a gas of the same type as the carrier gas utilized in a gas chromatograph, thereby degassing the reagents and displacing any other gases contained within the apparatus. The gas purge is discontinued and simultaneously therewith the inlets to the sample container are sealed against the atmosphere. A liquid sample such, for example, as blood, is introduced into the reaction chamber where it is mixed with the reagent to promote the reaction with the reagent. After a suitable time to allow for completion of the reaction, the mixing is discontinued and the sample container is inverted. Substantially simultaneously with the inversion of the sample container, carrier gas to a gas chromatograph is diverted through the sample container. The resultant mixture of the liquid sample and the reagent is therefore displaced from the reaction chamber through the packed section of the sample container by gravity and by the introduction of the carrier gas, thereby distributing the mixture over a large area and allowing ready release of the gases remaining dissolved therein. The gases evolved from the sample are eluted from the sample container by the carrier gas and the carrier gas is then transferred to its original path. Suitable valving is provided to permit causing the carrier gas to flow continuously through the column and the detector during the purging of the reagents and the sample container and during the time the sample is being reacted with the reagent. The valve is operated to transfer the carrier gas through the sample container after inversion thereof without substantial interruption of the continuous flow of the carrier gas for the period of time necessary to elute the gases released from the liquid sample.

Other objects and many of the attendant advantages of this invention will become more readily appreciated by those skilled in the art in light of the following description and drawings, it being understood that the drawings merely illustrate and the description describes only preferred embodiments of the method and apparatus of the present invention.

Figure 1:
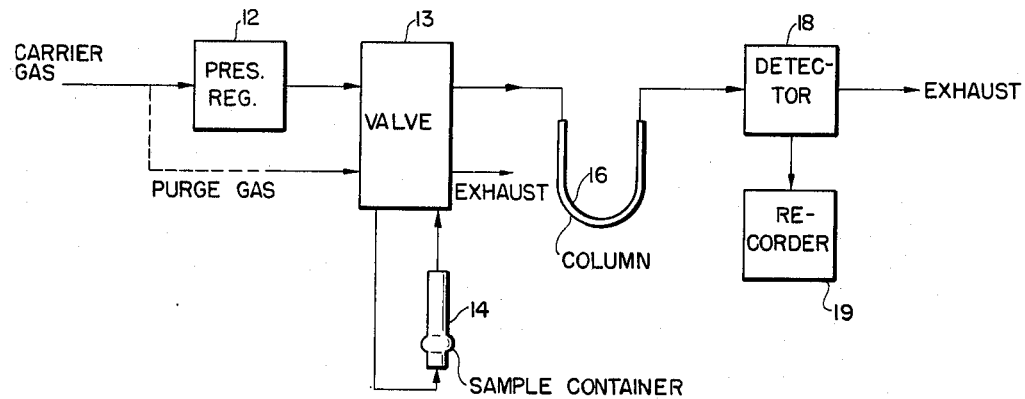
FIG. 1 is a block diagram illustrating a gas chromatograph embodying the present invention.

Referring now to FIG. 1 there is illustrated, by way of example only, a typical arrangement of a gas chromatograph embodying the teachings of the invention which includes a pressure regulator or flow controller 12, a valve 13, a sample container 14, a chromatographic column 16, a detector 18 and a recorder 19. Carrier gas which, for example, may be argon or helium is provided from any suitable source, not shown, and is controlled by pressure regulator 12. The carrier gas initially passes directly through valve 13, column 16 and detector 18 after which it is exhausted to the atmosphere. In many instances where it is desirable to utilize a detector of the thermal conductivity type this initial continuous flow of the carrier gas through the column and the detector is utilized to stabilize the detector for reasons well known to those skilled in the art.

A second inlet is provided in valve 13 for the passage of a purge gas through the sample container to degas the container and the contents thereof, the inner faces of the valve and the passages therethrough. The purge gas may be provided from the same gas source that supplies the carrier gas or, if preferred, from a separate source which is preferably of the same type of gas as the carrier gas. The purge gas flows through valve 13 to the inlet of the sample container 14, from the outlet thereof back through valve 13 and then is exhausted to the atmosphere. Valve 13 is operable to pass the purge gas through the sample container to degas the container and its contents and thereafter to discontinue the purge gas flow while simultaneously therewith sealing the conduits connected to the sample container to environmentally isolate the container from the atmosphere. Operation of valve 13 to purge the sample container and thereafter seal it from the atmosphere does not substantially interrupt the continuous flow of the carrier gas through the chromatographic column 16 and detector 18.

In operation, the valve is initially set to pass the carrier gas through the chromatograph column and the detector while sealing the inlet and outlet to the sample container. A suitable reagent is introduced into the reaction chamber of sample container 14 and valve 13 is operated to pass a purge gas through the sample container and the reagent to remove gases dissolved in the reagent and displacing any other gases within the apparatus. Valve 13 is then operated to discontinue the purge gas flow and seal the conduits to and from the container and a liquid sample, the gases of which are to be quantitatively analyzed in the chromatograph, is introduced into the reaction chamber without contamination of the interior environment of the container where, if desired, it may be mixed and heated to stimulate the reaction between the reagent and the sample. Suitable time is allowed for completion of the reaction between the reagent and the sample, the mixing and heating, if utilized, are discontinued and the sample container is inverted without changing the conduit connections thereto. Substantially simultaneously with the inversion of the sample container valve 13 is operated, without breaking the seal to the inlet and outlet conduits connected to the sample container and without substantial interruption of the continuous flow of the carrier gas through column 16 and detector 18, to transfer the flow of the carrier gas through the sample container. The liquid contained in the reaction chamber is displaced through a packing contained in the other end of the container by gravity and by the introduction of the carrier gas. Distribution of the liquid through the packing presents a large liquid surface area which provides ready release of the gases remaining dissolved in the solution. The gases evolved from the sample are swept from the container by the carrier gas into the chromatograph column 16 where the various components of the gaseous mixture are spatially separated by the process of selective absorption and desorption as it is well known to those skilled in the art. The successive gas components appearing in the effluent from the column are detected by detector 18 which provides an output indicating the presence of a sample component in the column effluent, the output being utilized as a quantitative measure of the component. The detector output is ordinarily recorded in some form for subsequent review by recorder 19 although the output may be merely indicated for contemporaneous visual inspection.

After sufficient time for the carrier gas to elute the gases contained by the sample from the container, valve 13 may be operated to discontinue the carrier gas flow through the container and to transfer this flow back to the original path without substantial interruption thereof. The sample container may then be removed and a new container inserted into the system and the process repeated on a second sample. In this manner a relatively large number of samples may be analyzed in a short period of time and since the carrier gas is not continuously passed through the aqueous solution in which in many cases the reagent is diluted, the deposit of water in the column which inhibits the absorption and desorption therein is greatly minimized.

Figure 3:
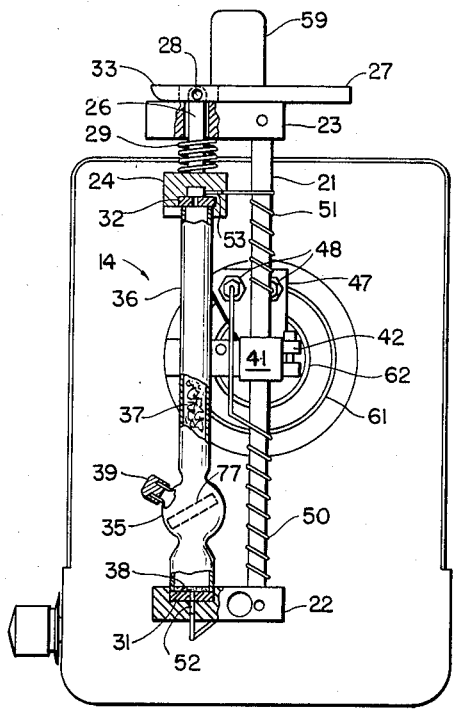
FIG. 3 illustrates a side elevation of the apparatus illustrated in FIG. 2.
Figure 2:
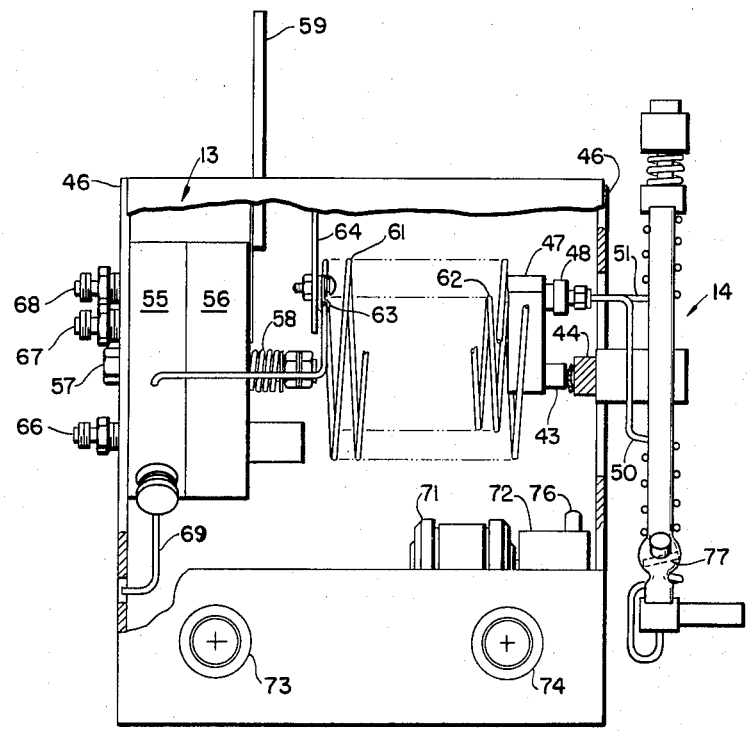
FIG. 2 illustrates a front elevation of one illustrative example of a preferred embodiment of a portion of the invention.

Referring now to FIGS. 2 and 3 there is illustrated, by way of example, apparatus for housing the valve 13, for rotatably mounting the sample container 14 and for providing the necessary conduits therebetween. The sample container suport, best illustrated in FIG. 3, generally comprises a post 21 at one end of which is secured a lower container support 22 and at the other end an upper mounting block 23. An upper container support 24 is secured to shaft 26 which passes through an aperture in the upper mounting block 23 and is secured to handle 27 by pin 28. Sample container 14 is clamped between the lower and upper container supports by the action of spring 29 which is normally under compression. Gaskets 31 and 32 respectively secured within a recess in the lower container support 22 and the upper container support 24 serve to seal the inlet and outlet of the container from the atmosphere and may be of any suitable material, such for example, as neoprene and are each provided with a central aperture for the passage of gas therethrough. Raising of handle 27 such that it pivots about the rounded portion 33 moves the upper container support against the compression of spring 29 for ready removal and insertion of the sample container 14.

The sample container 14 generally comprises an elongated, open-ended tube of any suitable material such as glass and has a reaction chamber 35 and a packed section 36 which is packed by any suitable inert, porous material 27 such as sand, fire brick, or glass beads which will allow the passage of gases therethrough while retaining liquids on its surfaces. The inlet to the reaction chamber 35 contains a porous plate 38 of a material such as Teflon which allows passage of gases therethrough but will retain liquids uopn its surface. A second inlet to the reaction chamber is closed by serum cap 39 which allows for the introduction into the reaction chamber for reagents and liquid samples by penetration thereof with a hypodermic syringe without contamination of the interior environment of the sample container by the exterior atmosphere.

Post 21 is rigidly secured to hub 41 by clamping member 42, hub 41 being fixed to shaft 43 as best illustrated in FIG. 2. Shaft 43 is mounted for rotation by any suitable bearing means, not shown, in support 44 which may be rigidly fixed to frame 46. Also carried by shaft 43 for rotation therewith is a connector block 47 which contains suitable connectors 48 for the connection of conduits 50 and 51 to the valve 13 in the manner hereinafter described. Conduit 50 is wrapped about the lower portion of the post 21 and is pressed within the aperture 52 provided in the lower container support 22 and may be secured and sealed therein by any suitable means such as by soldering. In similar manner the conduit 51 is wrapped about the upper portion of support 21 and sealed within the aperture 53 in upper container support 24.

Valve 13 which generally comprises a stationary valve block 55 and a rotary valve head 56 is mounted on frame 46 by bolt 57, the rotary valve head 56 being held in sealed relation with the stationary portion 55 by spring 58. Handle 59 is secured to valve head 56 to provide a means of rotation of the valve head to switch the various flows through the sample container 14 as has been heretofore described, the details of valve 13 being set forth in the description of FIGS. 4–7. Conduit 61 connects one outlet of the valve 13 to the inlet of the sample container by a passage through connector block 47 to conduit 50 while conduit 62 completes the gas passage from the outlet of the sample container through conduit 51, connector block 47 and back to an inlet in the stationary valve block 55. A portion of each of the conduits 61 and 62 is formed into a helix, one end thereof being connected to and sealed within the connector block 47 and the other end thereof rigidly secured by clamp 63 to support 64 which is affixed in any suitable manner to frame 46.

Connector 66 provides an inlet for the carrier gas of the chromatograph to valve 13, connector 68 provides an inlet for the purge gas while connector 67 provides for connection of the valve to a chromatograph column for passage of a carrier gas therethrough. Conduit 69 provides a path from valve 13 to the outside of frame 46 through which the purge gas is exhausted to the atmosphere. A like conduit, not shown, provides a path to exhaust the purge gas from the inner faces of valve 13 to the atmosphere as will be more particularly described in connection with FIGS. 4–7.

Motor 71 is mounted in any suitable manner to frame 46 and has a hub 72 affixed to the motor shaft for rotation therewith. Electrical switch 73 and potentiometer 74 may be connected in electrical series circuit with motor 71 to control the operation thereof. A bar magnet 76 passes through hub 72 for rotation therewith. A small bar magnet 77 is inserted into the reaction chamber 35 prior to placement of the sample container 14 in its supports and the magnetic coupling between magnet 76 and magnet 77 causes the smaller magnet 77 to rotate with bar magnet 76 thereby mixing the liquids contained within the reaction chamber, the rate of mixing being determined by the speed of the motor which may be adjusted by potentiometer 74.

Figure 6:
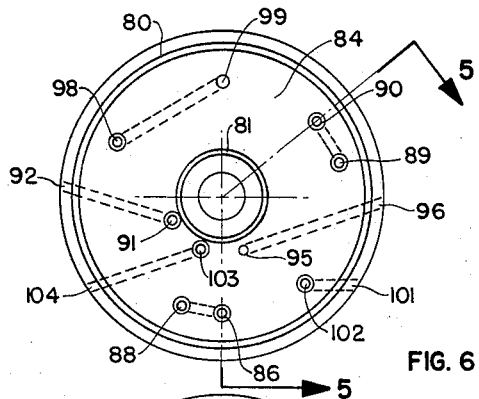
FIGS. 4–7 illustrate a valve suitable for use in the present invention.
Figure 5:
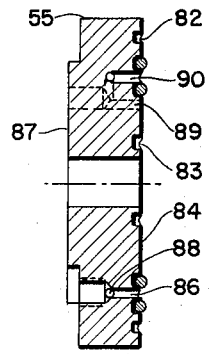
Figure 4:
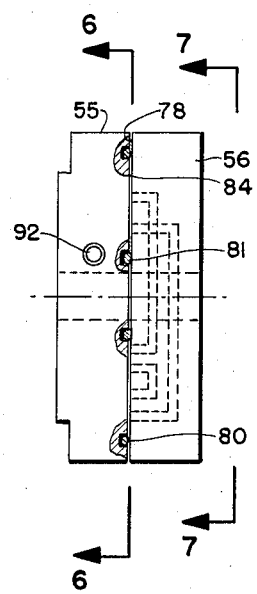

Referring now to FIGS. 4–7 there is illustrated in greater detail valve 13 and the operation thereof. As has been hereinbefore stated valve 13 comprises a stationary valve block 55 and a rotatable valve head 56 secured together by bolt 57 and spring 58. Each of the gas conduits in valve head 56 originates at the valve head inner face 78, passes into the valve head, traverses the head and exits again at inner face 78. None of the passages in valve head 56 are connected, but those portions which appear to traverse in FIGS. 7a–7c being in different horizontal planes as illustrated in FIG. 4. Valve block 55 and valve head 56 are sealed by O-rings 80 and 81 respectively fitted in the annular grooves 82 and 83 in the inner face 84 of valve block 55 as best illustrated in FIGS. 5 and 6. O-rings 80 and 81 are compressed against inner face 78 of valve head 56 by the action of spring 58 (FIG. 3) which is under compression.

Conduit 86 originates at the outer face 87 of valve block 55 and exits at the inner face 84, an interconnecting conduit traverses a portion of the valve block and also exits at the inner face. In a similar manner, a conduit 89 is provided from the outer face 87 to the inner face 84, conduit 90 originating at the inner face 84 and connects with conduit 89. A third conduit originates at the inner face 84 at 91 and exits through the side of valve block 55 at 92 while the fourth conduit originates at the inner face at 95 and exits through the side of the valve block at 96. A conduit 98 is provided from the outer face 87 to the inner face 84, this passageway connecting with a second conduit which traverses valve block 55 and exits at the inner face at 99. The sixth conduit enters the side of the valve block 55 at 101 and exits at the inner face at 102 and the final conduit originates at the inner face at 103 and exits through the side of the block at 104. Each of the outlets at the inner face 84 except outlets 95 and 99 are circumscribed by an O-ring fitted into an annular recess in the inner face 84 to seal each of these outlets against the inner face 78 of valve head 56.

Figure 7B:
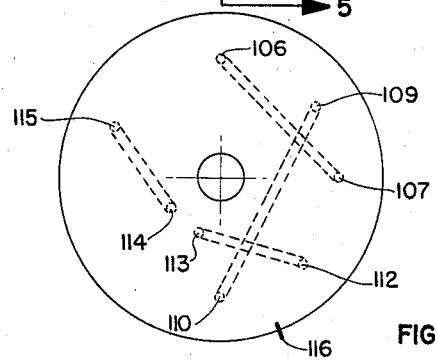
Figure 7A:
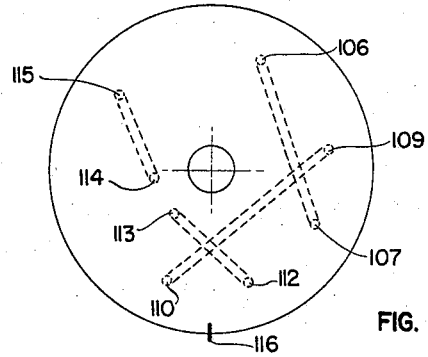
Figure 7C:
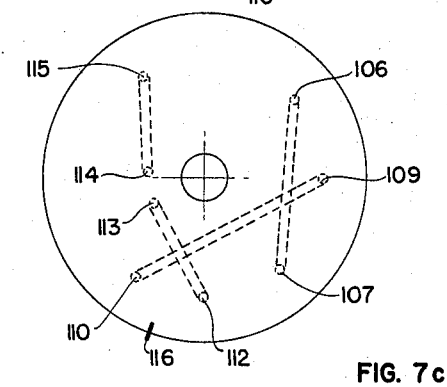

Referring now to FIGS. 7a, 7b and 7c there is illustrated the valve head 56 in its various positions relative to the valve block 55 of FIG. 6. FIG. 7a illustrates the valve head in the standby position where the sample container inlets are sealed from the atmosphere, FIG. 7b illustrates the valve in the position wherein the purge gas is passed through the sample container to degas the contents thereof and FIG. 7c illustrates the valve head in the position where the carrier gas is passed through the sample container. The conduits in the valve head 56 have respectively been indicated 106–107, 109–110, 112–113, and 114–115, index mark 116 being added to the drawing to illustrate the relative position of each of the figures.

Referring again to FIGS. 5 and 6 conduits 86, 98 and 89 are respectively connected at the outer face 87 of valve block 55 to the carrier gas source, the purge gas source and the inlet of the chromatograph column. Conduits 92 and 101 located in the side of valve block 55 are respectively connected to conduits 61 and 62 which are, respectively, the inlet and outlet conduits passing to the sample container 14. Conduit 104 is connected to conduit 69 which is open to the atmosphere as illustrated in FIG. 2 and conduit 96 is connected to a like conduit also open to the atmosphere but not shown in FIGS. 2 or 3.

When the valve is in the standby position, that is, the valve head is in the position illustrated in FIG. 7a, carrier gas enters the valve block 55 at the outer face 87 through conduit 86 which is sealed at the inner face by the O-ring and therefore flows through conduit 86 and 88, entering the valve head at 110 and leaves at 109 flowing into conduit 89 which is connected to the chromatograph column, conduit 90 being sealed by the O-ring at the inner face 84. Conduit 98 is sealed at the inner face by the O-ring thereabout; therefore purge gas entering conduit 98 at the outer face 87 flows through the interconnecting conduit where it is exhausted between the inner faces 78 and 84 because of the absence of an O-ring about passage 99. This valve purge gas is confined between the inner faces by O-rings 80 and 81. Since the purge gas is under pressure and because of the absence of an O-ring about conduit 95 at the inner face 84 it is exhausted through conduit 95 and 96 to the atmosphere. Since each of the other conduits opening into the inner face 84 of valve block 55 are circumscribed by O-rings, the valve purge does not contaminate any other portion of the system. Conduits 91–92 and 101–102 are sealed at the inner face 84 and therefore the inlet to and the outlet from the sample container are completely isolated from the atmosphere when valve head 56 is in the standby position.

The valve head 56 is rotated 22° 30' counterclockwise to the purge position illustrated in FIG. 7b. In this position conduit 110–109 is now positioned opposite conduit 86 and 90 in the valve block; therefore, carrier gas entering the valve block at 86 flows straight through conduit 86 through conduit 110–109, enters interconnecting conduit 90 and is exhausted to the chromatograph column through conduit 89, conduits 88 and 89 being sealed at the inner face by the O-rings thereabout. Conduit 109–110 is blocked only during the movement of the valve head; therefore the continuous flow of the carrier gas through the chromatograph column during this transition from standby to purge is substantially uninterrupted. In the purge position conduits 98 and 91 and conduits 102 and 103 in the valve block are respectively interconnected by conduits 114–115 and 112–113 in the valve head 56. Therefore, the purge gas follows the conduits 98, 115, 114, 91, 92, which is connected to the sample container, passes through the sample container, re-enters the valve block at 101 which is connected to the reactor outlet and follows the path 101, 102, 112, 113, 103 to 104 where it is exhausted to the atmosphere through conduit 69 (FIG. 2). As has been described, since conduit 99 contains no O-ring a portion of the purge gas will continue to flow through the interconnecting passage and be exhausted between the inner faces to continue to purge the valve as was described in connection with the standby position. It will be noted that in the purge position the portion 106 of conduit 106–107 is positioned directly opposite conduit 99 which is exhausting purge gas to the inner faces. Conduit 99 is larger than conduit 106–107 and since purge gas is flowing out of conduit 99 under pressure, even though small, it is presumed that a portion of the gas enters and flows through conduit 106–107 thereby exhausting any air which may be trapped therein.

Referring now to FIG. 7c the valve head is illustrated in a position whereby the carrier gas is passed through the sample container. Carrier gas enters the valve and passes through conduits 86, 112, 113, 91, 92, where it is connected to the inlet of the sample container, passes through the container and re-enters the valve block at 101 passing through conduits 102, 107, 106, 90 and 89 which is connected to the chromatograph column. All other conduits are sealed except conduits 99 and 95; therefore, the valve purge continues as has been hereinbefore described.

Referring again to FIGS. 2 and 3, magnet 77 is inserted in the reaction chamber 35 of sample container 14 and the container is inserted between the lower and upper container supports 22 and 24 by raising handle 27. The sample container is sealed between the supports by the action of spring 29 compressing the container between the gaskets 31 and 32. Valve 13 is positioned in the standby position and the carrier gas source turned on, the carrier gas passing through valve 13 to the chromatograph column and the detector. A suitable reagent is introduced into the reaction chamber 35 by penetration of the serum cap 39 with a hypodermic syringe, the reagent remaining atop plate 38 which, as has been described, will support liquids on its surface yet allow gases to pass therethrough. Valve 13 is moved to the purge position illustrated in FIG. 7b and purge gas passes through the valve, conduits 61, connector block 47, conduit 50, through container 14 and the contents thereof and returns through conduit 51, connector block 47 and conduit 62 where it re-enters the valve and is exhausted to the atmosphere through conduit 69. After a suitable length of time is allowed to degas the reagent and exhaust all of the gases from the container and the connecting conduits, valve 13 is again moved to the standby position illustrated in FIG. 7a. As has been hereinbefore described conduits 91 and 102 are now sealed against the inner face 78 of valve head 56 thereby completely isolating the sample container and its interconnecting conduits from contamination by the external atmosphere. The liquid sample, the gases of which are to be quantitatively analyzed in the gas chromatograph, is introduced into the reaction chamber with a hypodermic syringe by again penetrating the serum cap 39. Motor 71 is started by actuation of switch 73, the speed thereof being adjusted by rheostat 74. The magnetic coupling between the small magnet 77 and the magnet 76 rotated by motor 71 causes rotation of the small magnet and mixing of the sample and the reagent. The reaction therebetween may in some cases be stimulated by heating the solution which may be accomplished in any suitable manner such, for example, as a heater coil wrapped about the reaction chamber, a Bunsen burner flame applied to the exterior of the container or a heater probe which may be formed in the container as a part of the reaction chamber.

After sufficient time is allowed to complete the reaction between the reagent and the sample the mixing and, if utilized, the heating are discontinued. Post 21 is rotated on shaft 43 thereby inverting sample container 14 and simultaneously therewith valve 13 is transferred from the standby position to the position illustrated in FIG. 7c. The liquid is distributed through packing 37 by gravity and by the flow of the carrier gas through the container thereby distributing the liquid over a large area presenting a large liquid surface for ready release of the gas remaining absorbed in the sample and the gases evolved are eluted from the sample container by the carrier gas. The eluted sample gases are swept by the carrier gas back through valve 13 and into the chromatograph column where partitioning takes place, the components eluted from the column being detected by the detector and subsequently exhausted to the atmosphere. After allowing sufficient time for the sample gases to be eluted from the container and through valve 13, the valve head 56 is returned to the standby position thereby discontinuing the flow of a carrier gas through container 14. As has been hereinbefore set forth, this relatively short period of time during which the carrier gas traverses the sample container substantially reduces the quantity of water and any other liquids picked up by the carrier gas stream and deposited in the column thereby greatly reducing the decrease in resolution by virtue of saturation of the carrier gas with fluids which after a period of time render the column ineffective.

Referring again to FIGS. 2 and 3 it should be noted that connector block 47 being affixed to shaft 43 rotates therewith when the sample container is inverted. By forming conduits 61 and 62 into helixes of relatively large diameter and a substantial number of turns, no substantial deformation of the conduits occurs, thus allowing continued inversion of the sample container without rupture of the interconnecting conduits.

If desired, mixing and heating of the reagent and the sample within the reaction chamber may be accomplished by ultrasonic means. To accomplish this it has been found convenient to flatten a portion of the outer surface of the reaction chamber 35, covering this surface with a small quantity of silicon grease and placing the armature on the ultrasonic transducer against this surface. It has been found in practice that a 1.0 ml. aqueous solution may be mixed and heated at the rate of ½° centigrade per second when operating the transducer in the range of 22 kc.

By way of example a typical analysis of a blood sample may be carried out in the foregoing apparatus in the following manner. A solution of potassium ferricyanide, saponin and a defoaming agent is prepared by dissolving 8 gm. of saponin, 32 gm. of potassium ferricyanide and one drop of defoaming agent in one liter of water. A lactic acid solution is prepared by diluting 10 cc. of lactic acid in one liter of water and 0.5 ml. of each of these aqueous solutions are introduced into the reaction chamber of the sample container. The reagents and the sample container are degassed by passing the purge gas, in this example helium, through the sample container for a period of 2–5 minutes. A sample of blood is introduced into the reaction chamber and mixed with the reagents for a period of 30 seconds to about 3 minutes. The sample container is inverted and the carrier gas is transferred through the sample container for about 30–60 seconds. Utilizing the foregoing reagents and time ranges an analysis of a 0.10 ml. of normal, healthy blood was carried out and the following gases were eluted from the chromatograph column: 0.18 cc. of oxygen in about 2.5 minutes; 0.50 cc. carbon dioxide in 5.0 minutes; 0.04 cc. of nitrogen in 3.5 minutes and 0.002 cc. of carbon monoxide in about 6.6 minutes. The chromatographic column was composed of two sections connected in series, the first a six-foot long section packed with silica gel and the second a five-foot section packed with Molecular Sieve, both sections being one-quarter inch in diameter. The carrier gas was helium and the base for the elution times occurs when the carrier gas is transferred through the sample container. It should be understood by those skilled in the art that the elution times of these various gases may be decreased or increased at a given carrier gas flow rate, depending upon the desired results, by varying the length and diameter of the columns and of the composition of the packing contained therein.

In the field of biological oxygen demand (B.O.D.) analysis, it is the general practice to isolate an active biological sample in an environment of water and oxygen for a relatively long period of time such, for example, as periods of from 1–5 days and then measure the oxygen remaining in the container. This method provides an index of the demand of the sample for oxygen. By slight modification, the preferred embodiment may be readily adapted for convenient use in B.O.D. analysis.

Figure 8:
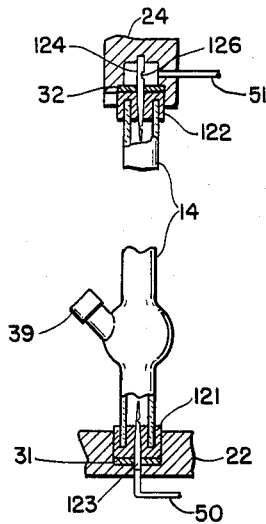
FIG. 8 illustrates a second embodiment of a portion of the invention particularly adapted for biological oxygen demand analysis.

Referring now to FIG. 8 there is illustrated an alternate embodiment of the invention adapted for use in B.O.D. analysis. Since the sample must be isolated within the container for relatively long periods of time, the inlet and outlet of sample container 14 are closed with serum caps 121 and 122, respectively, and the packing within the container is omitted. Secured in any suitable manner within the lower and upper container supports 22 and 24 are hypodermic needles 123 and 124 which project therefrom a sufficient length for complete penetration of serum caps 121 and 122 when the container is properly seated between the container supports. Conduits 50 and 51 are respectively secured within the lower and upper container supports 22 and 24 in the manner hereinbefore described and hypodermic needle 124 may be provided with an aperture 126 for the admission of gas thereto, the gas passing through a longitudinal passage in hypodermic needle 123 in the usual manner. Gaskets 31 and 32 normally utilized to seal the inlet and outlet of the container may, if desired, be omitted from this embodiment since the serum caps serve to seal the inlet and outlet from the exterior environment.

In performing the B.O.D. analysis the sample container is inserted between the supports and purged with an inert gas such as helium or argon in the manner hereinbefore described, the purge gas entering the container through hypodermic needle 123 and exhausted therefrom through hypodermic needle 124. A known volume of water, a known volume of sample the oxygen demand of which is desired and a known quantity of oxygen are introduced into the container through serum cap 39. The container is removed from between supports 22 and 24 and kept at a given temperature and agitated in accordance with accepted procedures for B.O.D. analysis. After remaining in this condition for the desired period of time, generally from 1–5 days, it is necessary to measure the oxygen remaining in the container to provide an index of the demand of the sample for oxygen. In order to accurately measure the oxygen remaining in the container it is necessary to elute all of the air from within the valve and the connecting conduits.

As has been hereinbefore described when the valve is in the purge position, purge gas flows through the valve, conduit 61, connector block 47, conduit 50, through the sample container and back through conduit 51, connector block 47, conduit 62, through valve 13 and is exhausted to the atmosphere. Since, however, in the case of B.O.D. analysis no sample container is contained between the supports this path is incomplete. By forcing purge gas back through the exhaust opening in valve 13 all portions of the system may be purged of air. To accomplish this valve head 56 is moved to the purge position as illustrated in FIG. 7b and the purge gas enters valve block 55 through conduit 98, passes through conduit 115–114 in the valve head, re-enters the valve block and passes through conduit 91–92 which is connected to conduit 61, flows through conduit 61, connector block 47, conduit 50 and hypodermic needle 123 where it is exhausted to the atmosphere. By also connecting the purge gas source to the exhaust conduit of the valve, purge gas enters valve block 55 at 104 and follows the path 103, 113–112, 102, 101, conduit 62, connector block 47, conduit 51 and hypodermic needle 124 and is exhausted to the atmosphere. Thus all of the passages between supports 22 and 24 may be purged of all air contained therein. As the purge gas is flowing through these two paths, the sample container is again inserted between supports 22 and 24 and the serum caps 121 and 122 penetrated by hypodermic needles 123 and 124. After penetration, the purge gas is discontinued by moving the valve to the standby position illustrated in FIG. 7a thereby again environmentally sealing the container and its contents. Transfer of the valve to the position illustrated in FIG. 7c passes the carrier gas through the sample container and elutes the oxygen remaining therein, passes it through the chromatograph column and the detector, the output of which is a measure of the oxygen remaining in the container.

Figure 9:
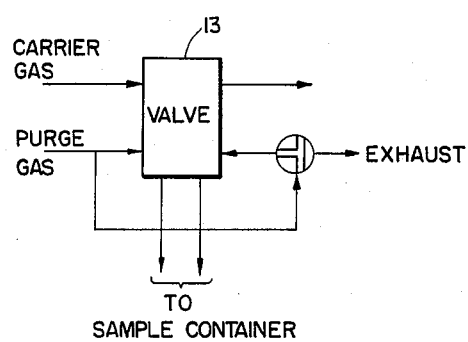
FIG. 9 illustrates a modification of the block diagram of FIG. 1 employed with the embodiment of FIG. 8.

By providing the exhaust conduit connected to conduit 104 in valve block 55 with a three-way valve, a diagrammatic representation of which is illustrated in the flow diagram of FIG. 9, both steps of the foregoing process, i.e., the initial purge of the sample container and the purge of the connecting conduits prior to reinsertion of the sample container into the system may be conveniently accomplished.

There has been illustrated and described by way of example only preferred embodiments of the method and apparatus of the present invention wherein the gases contained within a relatively large number of samples may be accurately analyzed in a relatively short period of time and a modification thereto which adapts the apparatus for maximum efficiency in performing biological oxygen demand analysis. It is to be understood that the foregoing description relates only to the preferred embodiments of the invention illustrated in the drawings and that numerous modifications or alterations may be made therein without departing from the spirit and the scope of the invention as set forth in the appended claims.

What is claimed is:

1. A device for processing a liquid sample for quantitative analysis of the gases contained therein in a gas chromatograph comprising:

a container having a reaction chamber and a packing section;

an inert, porous packing contained in said packing section;

rotatable means supporting said container; said rotatable means having passages therein for the passage of gases through said container;

means for mixing a solution contained in said reaction chamber; and valve means for selectively passing a purge gas through said container and for transferring the carrier gas of a gas chromatograph through said container without substantially interrupting the continuous flow thereof whereby a reagent may be introduced into the reaction chamber, the reagent and the container degassed, a liquid sample introduced into the reaction chamber and reacted with said reagent and the carrier gas of a gas chromatograph passed through said container to elute the gases released from said liquid sample.

2. A device for processing a liquid sample for quantitative analysis of the gases contained therein in a gas chromatograph comprising:

a container having a reaction chamber and a packed section;

means for passing gases through said container; valve means connected to said last named means for selectively passing a purge gas through said container to degas said container and the contents thereof, for environmentally sealing said container and for transferring the carrier gas of a gas chromatograph through said container without substantially interrupting the continuous flow thereof; and means for inverting said container to distribute the contents of the reaction chamber through said packed section whereby prior to inverting a reagent may be placed in said reaction chamber, the reagent and said container degassed, the reagent and the liquid sample reacted in said reaction chamber and the container then inverted to distribute the contents thereof through said packed section thereby presenting a large liquid surface for ready release of the gases evolved from the liquid sample for elution by the carrier gas of the chromatograph when said carrier gas is transferred by said valve means.

3. A device for the preparation of a liquid sample for quantitative analysis of the gases therein in a gas chromatograph comprising:

a container having a reaction chamber and a packing section;

an inert, porous packing in said packing section;

means in the walls of said container allowing insertion of liquid into said container without contamination of the interior environment thereof;

conduit means for passing gases through said container;

valve means connected to said conduit means for selectively passing a purge gas through said container and the contents thereof to degas said container and said contents, for thereafter environmentally sealing said container, and for passing the carrier gas stream of a gas chromatograph through said container without substantially interrupting the continuous flow thereof;

mixing means for mixing the contents in said reaction chamber; and means for inverting said container to distribute the contents thereof through said packing to provide a large liquid surface for ready release of the gases contained in the liquid sample.

4. An analytical apparatus for the analysis of gases contained in a liquid sample comprising:

a sample container having an inlet and an outlet, a reaction chamber and a packed section;

means in sealed contact with said container allowing insertion into said container of solutions without contamination of the interior environment thereof;

means for mixing the contents of said reaction chamber;

a chromatographic column for separating components of gaseous mixtures;

detector means connected to said chromatographic column and sensitive to the variations in the characteristics of the effluent from said column;

valving means connected to said container and to said column for selectively passing a continuous stream of carrier gas through said column, for passing a purge gas through said container to degas said container and the contents thereof, for thereafter environmentally sealing said container, and for transferring said carrier gas through said container without substantially interrupting the continuous flow of said carrier gas; and means for inverting the container to distribute the contents thereof through said packed section to provide a large liquid surface for ready release of the gases contained in the liquid sample whereby the gases released by the liquid sample may be eluted from said container by the carrier gas traversing said column.

5. An analytical apparatus for analysis of gases contained in a liquid sample comprising:

a sample container having a reaction chamber and a packed section;

a chromatographic column for separating components of gaseous mixtures;

detector means connected to said column and sensitive to variations in the characteristics of the effluent from said column;

valving means connected to said column and to said container for selectively passing a continuous stream of carrier gas through said column, for passing a purge gas through said container, for thereafter environmentally sealing said container and for transferring said continuous stream of carrier gas through said container without substantial interruption thereof; and means for inverting said container to distribute the contents of said reaction chamber through said packed section for providing a large liquid surface for ready release of the gases in the sample during the elution of said gases from said container by said carrier gas.

6. An apparatus for processing a liquid sample in a sample container having a reaction chamber and a porously packed section comprising:

rotatable support means for supporting a sample container;

conduit means connected to said support means for passing gases through the container;

valve means connected to said conduit means and adapted to be connected to a gas chromatograph;

said valve means operable for selectively connecting said conduit means to a source of purge gas for degassing the contents of a container supported by said support means, for thereafter environmentally sealing said conduit means and for transferring the carrier gas of a gas chromatograph through said conduit means to elute the gaseous contents of the container, each without substantial interruption of the continuous flow of the carrier gas through said gas chromatograph whereby a reagent may be placed in the reaction chamber of the container, the reagent and the container degassed, the liquid sample reacted with the reagent in the reaction chamber and the container inverted by rotation of said rotatable support means to distribute the mixture over a large area presented by said packed section for ready elution of the gases evolved from the liquid sample by the carrier gas upon operation of said valve means.

7. An apparatus for processing a liquid sample for quantitative analysis of the gases contained therein comprising:

a rotatable support means for supporting a sample container;

upper and lower container support sealing means in said support means for sealing the container in airtight relation with said support means;

gas conduit means connected to said support means for passing gases through the container;

valve means connected to said conduit means and adapted for connection to a gas chromatograph;

said valve means operable for selectively connecting said conduit means to a source of purge gas for degassing the contents of the container, for thereafter environmentally sealing said conduit means and the container and alternately for transferring the carrier gas of a gas chromatograph through said conduit means to elute the gaseous contents of the container, each without substantially interrupting the continuous flow of the carrier gas through said gas chromatograph.

8. An apparatus for use in oxygen demand analysis of a sample comprising:
  support means in which a sealed container provided with sealing means is held;
  conduit means connected to said support means, said conduit means including needle means for penetrating seals in the sealed container;
  valve means connected to said conduit means for selectively degassing said conduit means and the container, for degassing said conduit means in the absence of the container and for passing the carrier gas of a gas chromatograph through said container without substantial interruption of the continuous flow thereof.

References Cited by the Examiner

UNITED STATES PATENTS

| | | | |
|---|---|---|---|
| 191,789 | 7/1877 | Winn | 261—83 |
| 2,773,747 | 12/1956 | King et al. | 23—253 |
| 3,111,390 | 11/1963 | Taylor | 23—253 |
| 3,118,736 | 1/1964 | Taylor | 23—230 |
| 3,171,722 | 3/1965 | Natelson | 23—253 |

MORRIS O. WOLK, *Primary Examiner.*

DELBERT E. GANTZ, *Examiner.*